United States Patent [19]
Huang

[11] Patent Number: 6,027,683
[45] Date of Patent: Feb. 22, 2000

[54] EXTRUSION MOLDING PROCESS AND APPARATUS

[76] Inventor: Ing Chung Huang, No. 218 Cheng Kung Three Road, Nantou, Taiwan

[21] Appl. No.: 08/876,495

[22] Filed: Jun. 16, 1997

[30] Foreign Application Priority Data

Jun. 17, 1996 [TW] Taiwan ................................. 85107312

[51] Int. Cl.$^7$ .................................................. B29C 49/62
[52] U.S. Cl. ......................... 264/504; 264/532; 264/526; 29/421.1
[58] Field of Search ..................... 264/524, 529, 264/532, 526, 534, 540, 541, 504; 425/529; 29/421.1

[56] References Cited

U.S. PATENT DOCUMENTS

| | | |
|---|---|---|
| 1,409,154 | 3/1922 | Davis . |
| 2,975,472 | 3/1961 | Colombo ................................. 264/524 |
| 3,450,805 | 6/1969 | Chesser . |
| 3,896,648 | 7/1975 | Schertenleib ........................... 29/421.1 |
| 4,092,389 | 5/1978 | Sakurai ................................... 264/504 |
| 4,116,608 | 9/1978 | Uhlig . |
| 4,143,453 | 3/1979 | Taluba ..................................... 264/540 |
| 4,153,408 | 5/1979 | Albert et al. ............................ 425/529 |
| 5,253,995 | 10/1993 | Romstad et al. ....................... 264/524 |

FOREIGN PATENT DOCUMENTS

| | | | |
|---|---|---|---|
| 1338443 | 4/1963 | France ................................... 264/524 |
| 56-50695 | 12/1981 | Japan ..................................... 264/532 |
| 57-83434 | 5/1982 | Japan ..................................... 264/524 |
| 57-83435 | 5/1982 | Japan ..................................... 264/524 |
| 57-83436 | 5/1982 | Japan ..................................... 264/524 |
| 60-120031 | 3/1983 | Japan . |
| 59-184625 | 4/1983 | Japan . |
| 5-31788 | 2/1993 | Japan ..................................... 264/531 |

*Primary Examiner*—Catherine Timm
*Attorney, Agent, or Firm*—Bacon & Thomas, PLLC

[57] ABSTRACT

An extruded tubular molding is clamped at upper and lower portions thereof to form an air-tight space therebetween and thereafter compressed within two corresponding halves of a molding die and molded into the configuration of a final product. The lower portion of the molding is first clamped and lowered to stretch the molding downwardly prior to clamping the upper portion and compressing the molding in the molding die.

7 Claims, 10 Drawing Sheets

EXTRUSION MOLDING PROCESS AND APPARATUS

BACKGROUND OF THE INVENTION

The present invention relates to an extrusion molding process, and more particularly to such an extrusion molding process in which the extruded tubular molding from an extruding die is clamped by two clamping devices at different elevations and downwardly stretched, and two symmetrical halves of a molding die are closed on the clamped molding between the clamping devices, causing the clamped molding to be compressed and molded into a finished product.

According to a conventional method of fabricating hollow plastic products through an extrusion molding process, plastic material is extruded into a molding through an extruding die and then seized by a clamping means and retained in a die cavity of a molding die, and then a cutting tool is moved to cut off the molding from the extruding die, and then a nozzle is inserted into the molding and air is blown into the molding in the die cavity of the molding die, causing the molding to be expanded and molded into a finished product. After molding, the molding die is lowered and then opened. After the finished product is removed from the molding die, the molding die is returned to its former position for a next molding cycle. This extrusion molding method has numerous drawbacks as hereinafter outlined.

1. Nozzle and blower means must be provided so that air can be blown into the extruded molding, causing it to expand in the die cavity of the molding die.
2. When thermoplastic material is used and extruded into a molding through the extruding die and the extruded molding is seized by clamping means, the nozzle must be immediately inserted into the extruded molding so that the extruded molding can be swollen with to prevent its two opposite side walls from adhering together. This blow molding procedure is not suitable for making a hollow product having a short pitch between its two opposite side walls.
3. If the peripheral wall thickness of the extruded molding is not uniform, the extruded molding will bias from its course, thus being unable to fall to the accurate position for catching by clamping means. Even if the extruded molding is seized by clamping means and put in the die cavity of the molding die for molding, the nonuniform wall thickness may cause the side walls of the finished product to be partially adhered together after the finished product is removed from the molding die.

SUMMARY OF THE INVENTION

The present invention provides an extrusion molding process which eliminates the aforesaid drawbacks. According to the extrusion molding process of the present invention, when a molding formed from an extrudable material, such as extensible thermoplastic, rubber, metal, organic substances and extensible inorganic substances, is extruded from an extruding die, one clamping device of a molding die unit is clamped on the bottom end of the extruded molding and lowered to stretch the extruded molding downwards, then a second clamping device of the molding die unit is clamped on the upper end of the extruded molding, causing an air-tight space to be formed in the clamped molding, and then two symmetrical halves of a molding die are moved toward each other between the two clamping devices and then closed on the clamped molding, causing the molding to be compressed in the die cavity of the molding die. When the molding is compressed, its inside pressure is relatively increased, thereby causing the wall of the molding to be closely attached to the surface of the die cavity of the molding die. When the molding die is opened after molding, the clamping devices are released, and the molding die unit is lifted to its former position for a next molding cycle. According to another aspect of the present invention, the extruding die comprises a conical core, an air nozzle mounted in the conical core, a ring-shaped mold plate mounted around the conical core and defining a gap around the conical core through which gap fed material is extruded into an extruded molding, and adjustment screws controlled to adjust the gap between the conical core and the ring-shaped mold plate subject to the depth of the die cavity of the molding die. According to still another aspect of the present invention, the die cavity of the molding die has a raised recess which makes a particular part of the wall of the molded product thinner, so that the thin wall portion of the molded product can be forced to break by the inside pressure of the molded product upon opening of the molding die, for permitting the inside gas of the molded product to escape.

DETAILED DESCRIPTION OF THE PREFERRED EMBODIMENT

Figure 6:
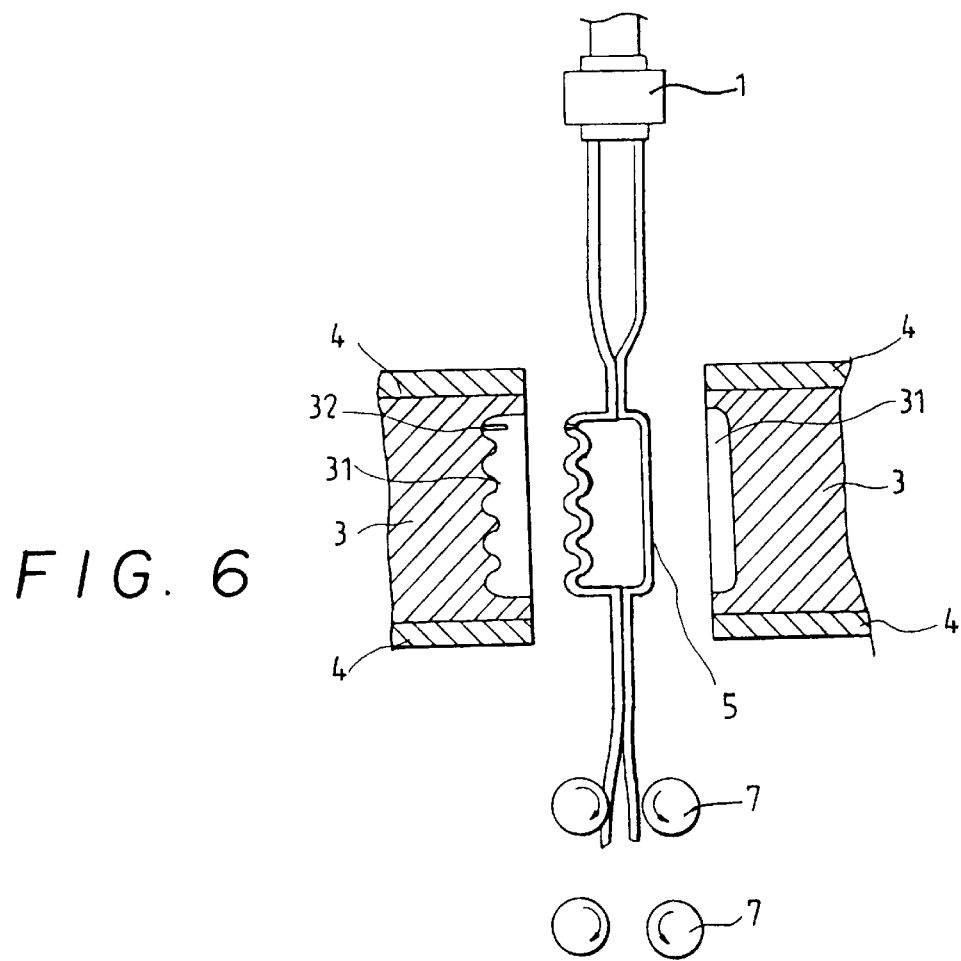
FIG. 6 is a sectional view of the extrusion molding apparatus according to the present invention, showing molding molded into a finished product, the molding die opened, and the clamping devices released.

Referring to FIG. 6, a molding die unit 2 is set below an extruding die 1, with die 1 capable of forming an extrusion from an extrudable material, such as thermoplastics, rubber, metal, extensible organic substances and extensible inorganic substances. A driving mechanism (now shown) is mounted on the molding die unit 2 for vertical or oblique lifting control. The molding die unit 2 comprises a molding die 3, and two clamping devices 4 mounted on both sides of the molding die 3. The molding die 3 is comprised of two symmetrical halves, having a cavity 31 defined between its two symmetrical halves and a pin 32 extending from within on half of the cavity 31. Rollers 7 of a roller conveyer are disposed below the molding die unit 2.

Figure 18:
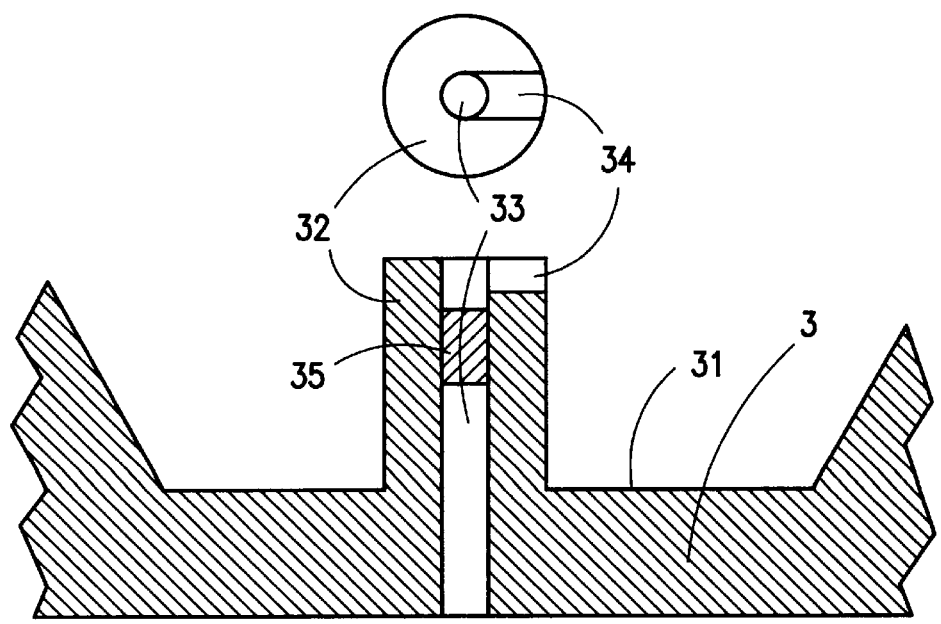
FIG. 18 is a sectional view of a part of the molding die, showing the structure of the pin in the die cavity.

Referring to FIG. 18, a through hole 33 is formed through the pin 32 of the molding die 3 which defines a passage for providing communication between the cavity 31 and the outside of the molding die 3. A groove 34 is formed on the end surface of the pin 32 and extends to the through hole 33, with groove 34 having at least one end passing to the periphery of the pin 32. An adjustment element 35 is mounted in the through hole 33. By adjusting the vertical position of the adjustment element 35 in the through hole 33, the wall thickness of the finished product in the through hole 33 is controlled within the range between the end surface of the pin 32 to the adjustment element 35. Therefore, when the die 31 is opened, the inside high pressure of the finished proudct immediately breaks the wall portion of the finished product which extends to the adjustment element 35, and escapes to the outside to let inside pressure and outside pressure be balanced.

When the aforesaid pin 32 is abutted against the pin of another cavity, high pressure from extrusion passes along the groove 34 to break the wall part of the finished product which extends to the adjustment element 35 and to escape to the outside. Alternatively, the aforesaid through hole 33 can be made at the surface of the cavity 31 at the desired location, and the aforesaid adjustment element 35 can be installed in the through hole 33 and adjusted to control the wall thickness of the finished product in the through hole 33, so that when the die is opened, the inside high pressure of the finished product immediately breaks the wall part of the finished product which extends to the adjustment element 35, and escapes to the outside to let inside pressure and outside pressure be balanced.

Figure 7:
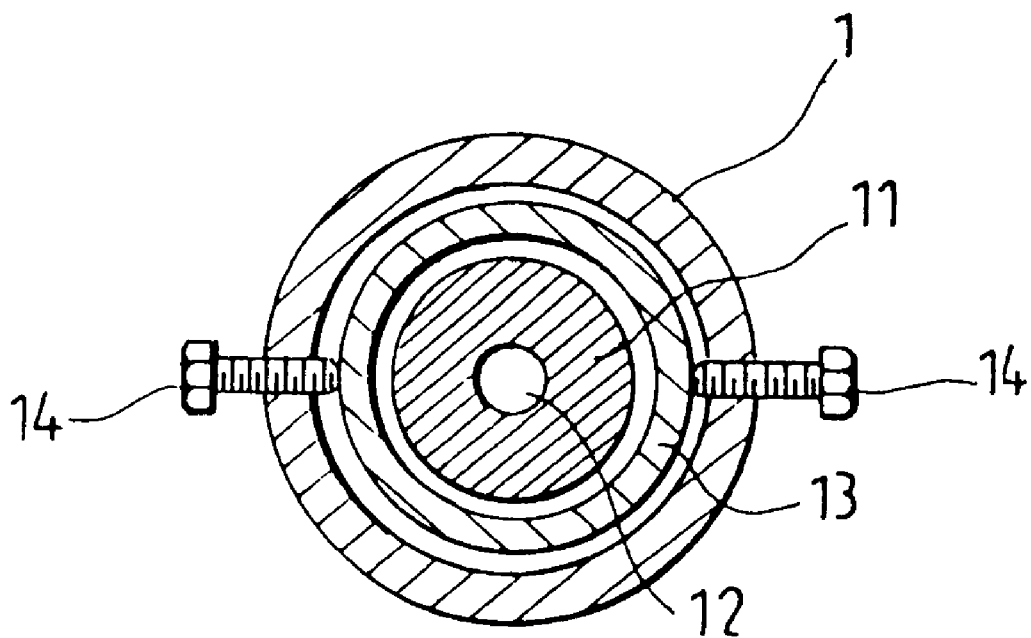
FIG. 7 is a cross sectional view of the extruding die according to the present invention.

Referring to FIG. 7, the extruding die 1 comprises a conical core 11 made subject to the design of the desired finished product, an air nozzle 12 mounted in the conical core 11, a ring-shaped mold plate 13 mounted around the conical core 11 and defining a gap therebetween; and adjustment screws 14 controlled to adjust the gap between the conical core 11 and the ring-shaped mold plate 13 subject to the depth of the cavity 31 of the molding die 3. Therefore, as seen in FIG. 6, when material is delivered to the extruding die 1, it can be extruded through the gap between the conical core 11 and the ring-shaped mold plate 13 into a molding 5 having a thickness corresponding to the depth of the cavity 31.

Figure 1:
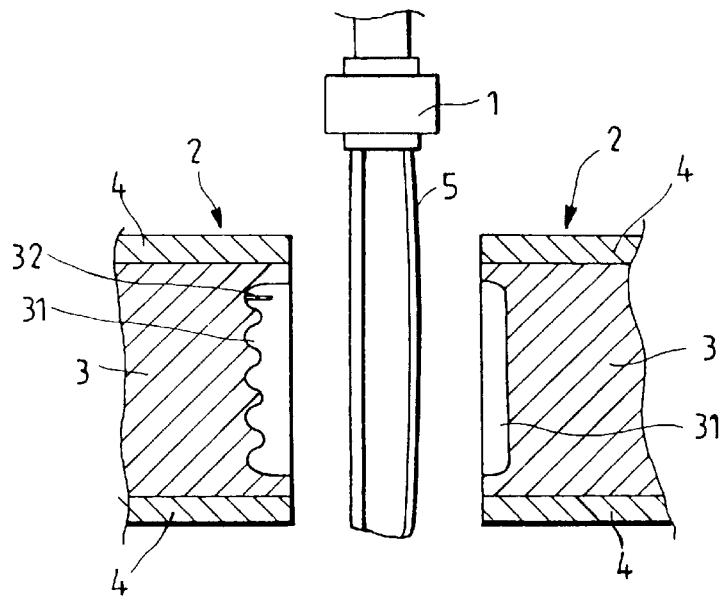
FIG. 1 is a sectional view of an extrusion molding apparatus showing a tubular molding extruded from the extruding die of the apparatus according to the present invention.
Figure 8:
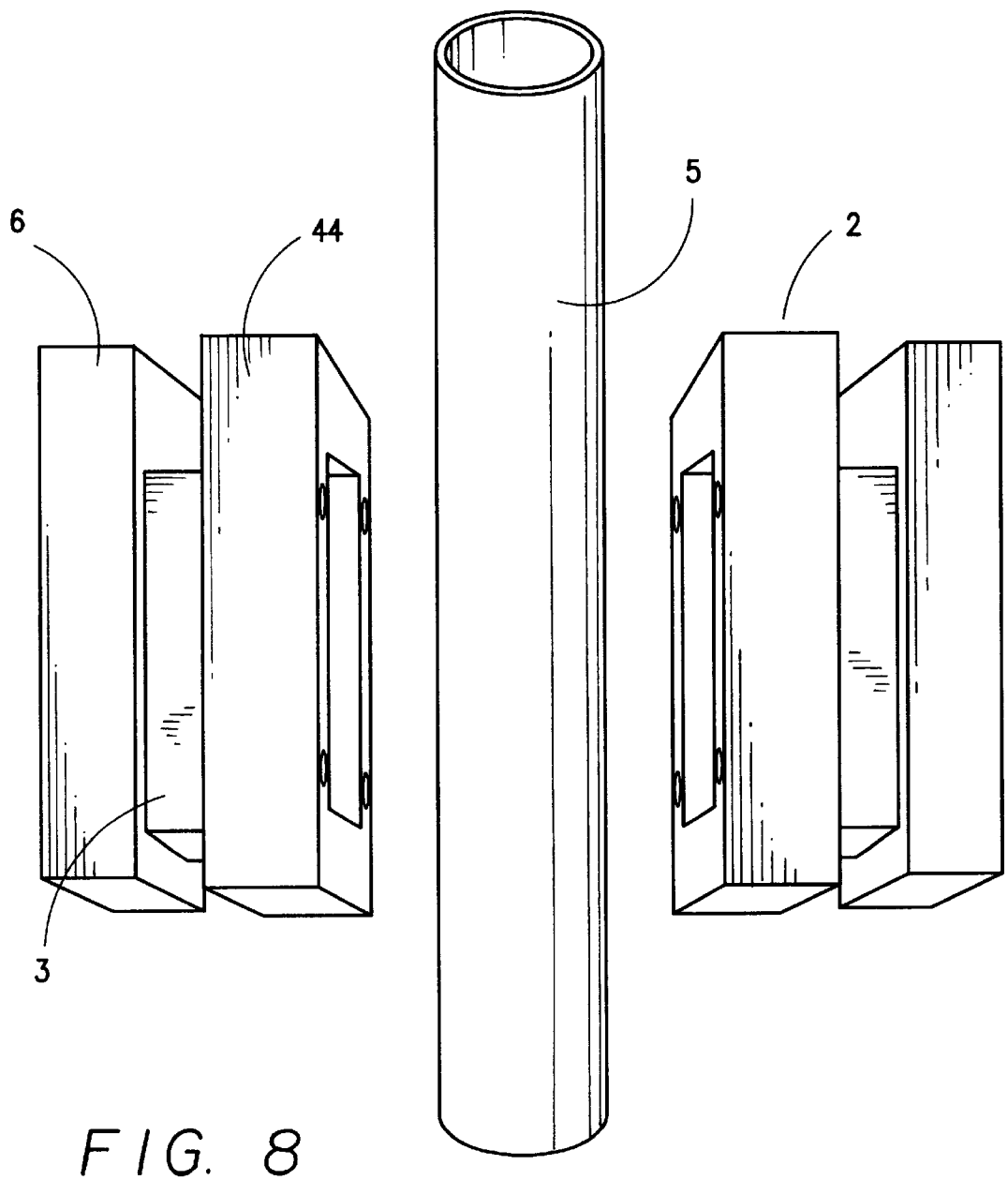
FIG. 8 shows the structure of a part of the molding die unit according to the present invention.
Figure 10:
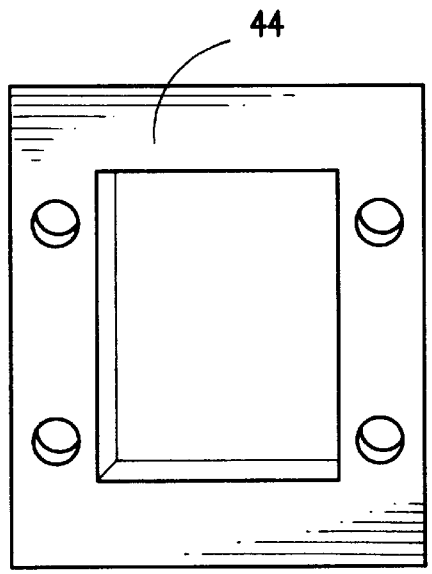
FIG. 10 is a view of the frame for the molding die unit according to the present invention.
Figure 9:
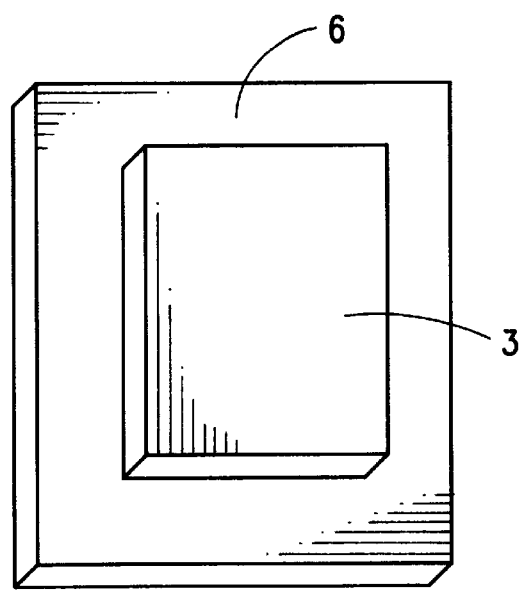
FIG. 9 shows one die half of the molding die mounted on a base plate according to the present invention.
Figure 11:
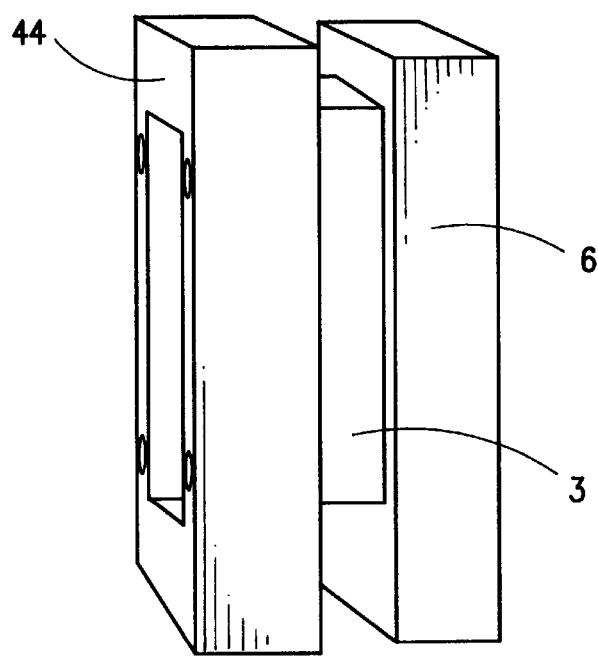
FIG. 11 shows one die half of the molding die connected between the base plate and the frame according to the present invention.
Figure 15:
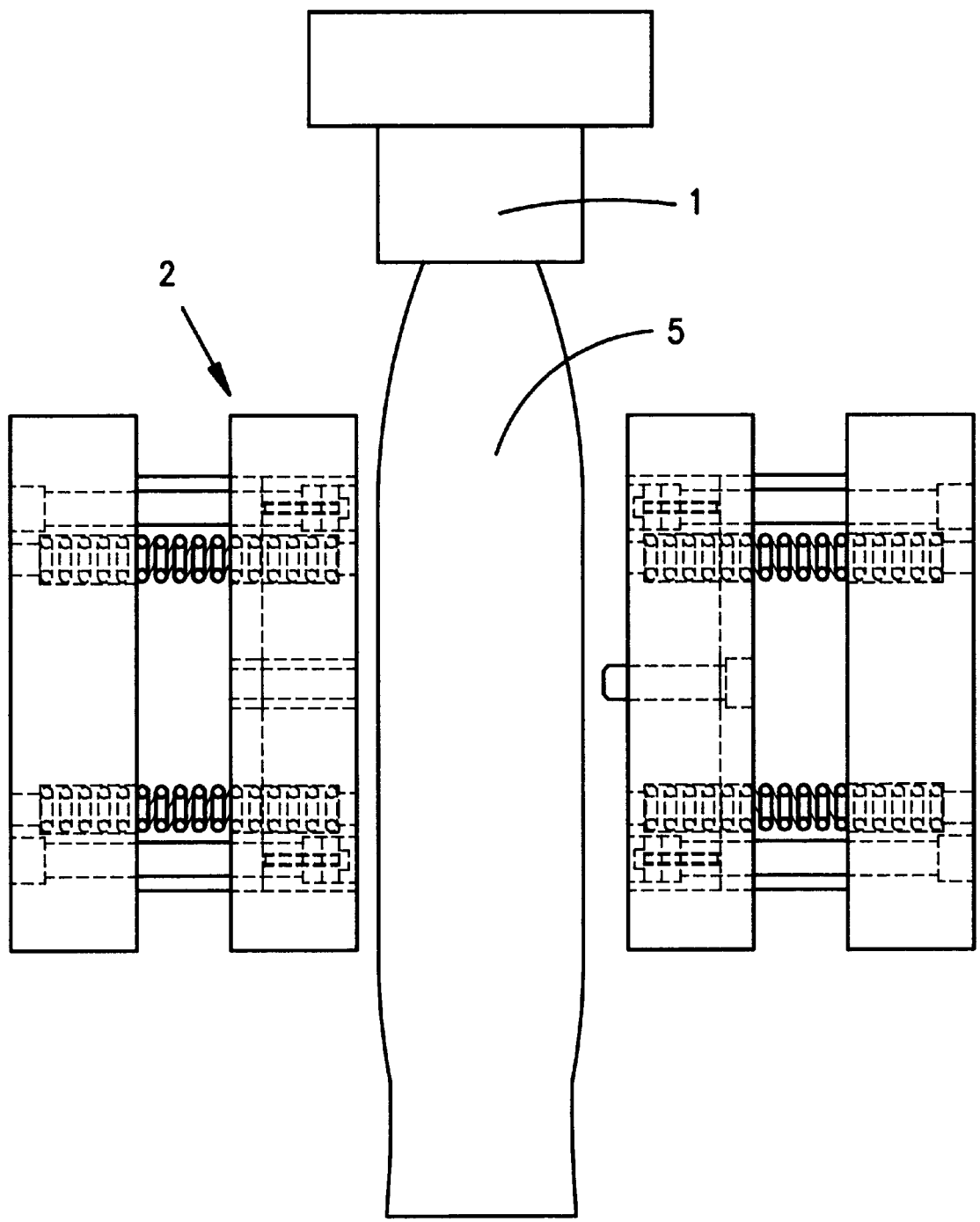
FIG. 15 is a side view of the present invention, showing a tubular molding extruded from the extruding die.

Referring to FIGS. 1, 8 and 15, when material is poured into the extruding machine, it is heated and extruded out of the extruding die 1 by a screw (this procedure is similar to the prior art, therefore it is neither shown in the drawings nor described in detail). Before extrusion, the gap between the conical core 11 and the ring-shaped mold plate 13 is adjusted subject to the depth of the cavity 31. When extruded, the molding 5 has a uniform wall thickness falling to the molding die 3.

Figure 2:
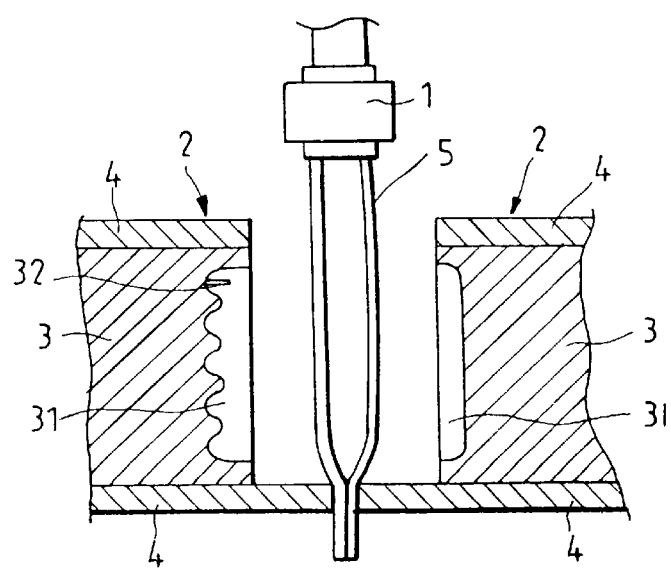
FIG. 2 is a sectional view of the extrusion molding apparatus of the present invention, showing the lower clamping device clamped on the bottom end of the tubular molding.

Referring to FIG. 2, when the molding 5 falls from extruding die 1 at a certain distance, the two symmetrical parts of the clamping device 4 which is disposed at the bottom side remote from the extruding die 1 are moved toward each other at a fixed speed to hold down the bottom end of the molding 5.

Figure 3:
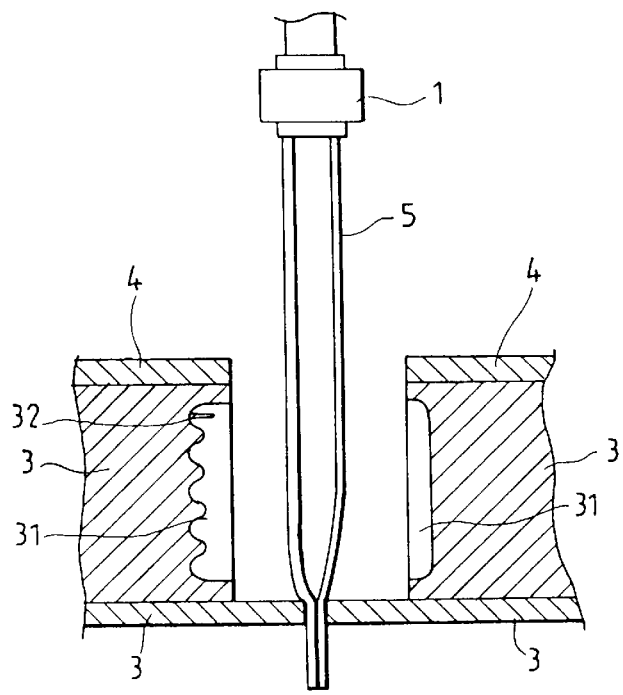
FIG. 3 is a sectional view of the extrusion molding apparatus according to the present invention, showing the molding die unit lowered, and the tubular molding stretched downwards.

Referring to FIG. 3, when the bottom end of the molding 5 is seized by the clamping device 4 at the bottom side, the whole molding die unit 2 is moved downwards at a constant speed, causing the molding 5 to be simultaneously stretched downwards.

Figure 4:
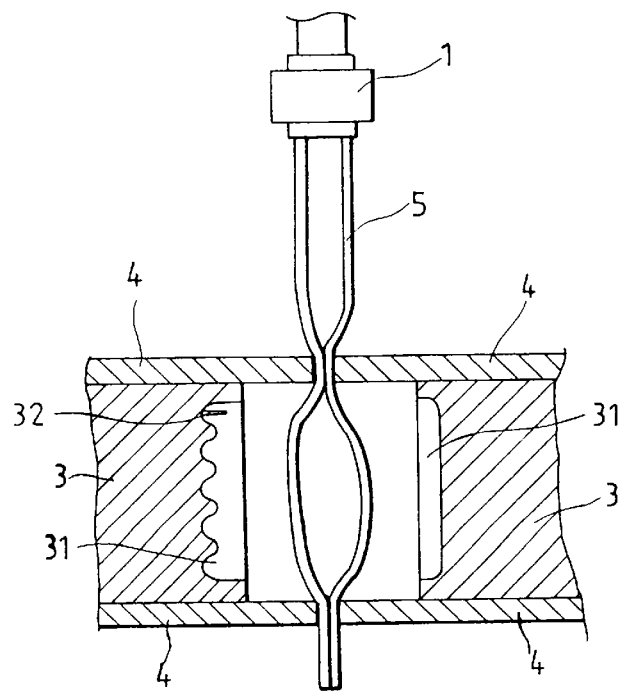
FIG. 4 is a sectional view of the extrusion molding apparatus according to the present invention, showing the upper clamping device and the lower clamping device respectively clamped on the tubular molding at different elevations.

Referring to FIG. 4, when the molding 5 is stretched downwards, the two symmetrical parts of the clamping device 4 at the top side are moved toward each other to clamp the molding 5.

Figure 5:
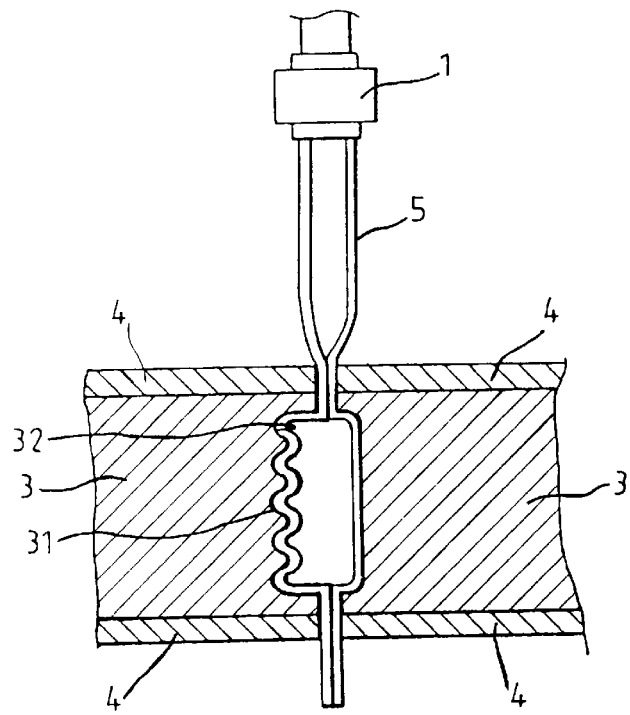
FIG. 5 is a sectional view of the extrusion molding apparatus according to the present invention, showing the upper clamping device and the lower clamping device respectively clamped on the tubular molding at different elevations, and the molding die closed on the tubular molding between the clamping devices.

Referring to FIG. 5, when the two clamping devices 4 are respectively secured to the molding 5, the molding die unit 2 is continuously moved downwards at a constant speed, and at the same time the two symmetrical halves of the molding die 3 are moved toward each other and closed on the molding 5. Because the molding 5 has a tubular configuration and its both ends are sealed by the clamping devices 4, the volume of the molding 5 between the clamping devices 4 is relatively reduced when the two symmetrical halves of the molding die 3 are moved toward each other against the molding 5. According to Boyle and Richard's law $P_1V_1 = P_2V_2 = NRT$, the inside pressure of the molding 5 between the clamping devices 4 is relatively increased when compressed by the molding die 3, therefore the wall of the molding 5 between the clamping devices 4 is forced by the increased inside pressure of the molding 5 to closely adhere to the surface of the cavity 31 of the molding die 3. Because the molding 5 is stretched downwards and its both ends are seized by the clamping devices 4 and the inside pressure of the molding 5 forces the tubular wall of the molding 5 to expand, the molding 5 expands uniformly in three dimensions.

Referring to FIGS. 6 and 18, when the molding die unit 2 is closed on the molding 5 and lowered to the set location, the two symmetrical halves of the molding die 3 are bilaterally moved away from the molding 5, and the clamping devices 4 are simultaneously released from the molding 5. When the molding die 3 is opened from the molding 5, the wall part of the molding 5 corresponding to the pin 32 is relatively thinner and immediately broken by the inside pressure of the molding 5 upon the opening of the molding die 3, permitting the inside pressure of the molding 5 to be maintained balanced with the outside pressure. When the molding 5 is molded into the desired shape of the finished product, the molding die unit 2 is released, permitting the finished product to be delivered by the rollers 7 to the collecting area, and then the molding die unit 2 is moved back to its former position for a next cycle.

Referring to FIGS. 8, 9, 10 and 11, each half of the molding die 3 is mounted on a respective base plate 6, and each part of each clamping device 4 is mounted on a frame 44 around one half of the molding die 3.

Figure 12:
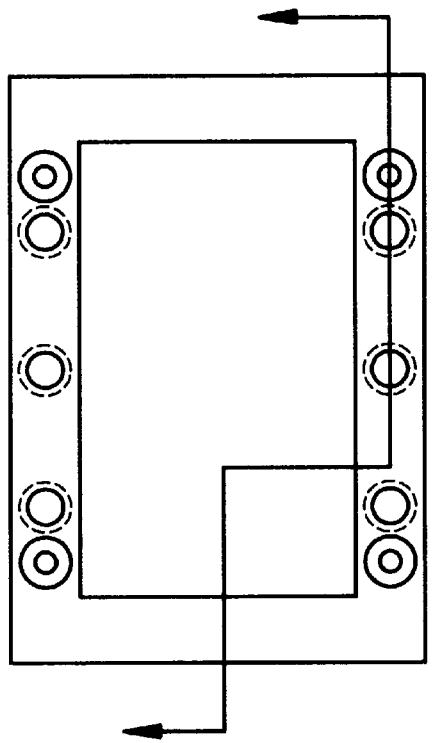
FIG. 12 is a front view of the molding die unit according to the present invention.
Figure 13:
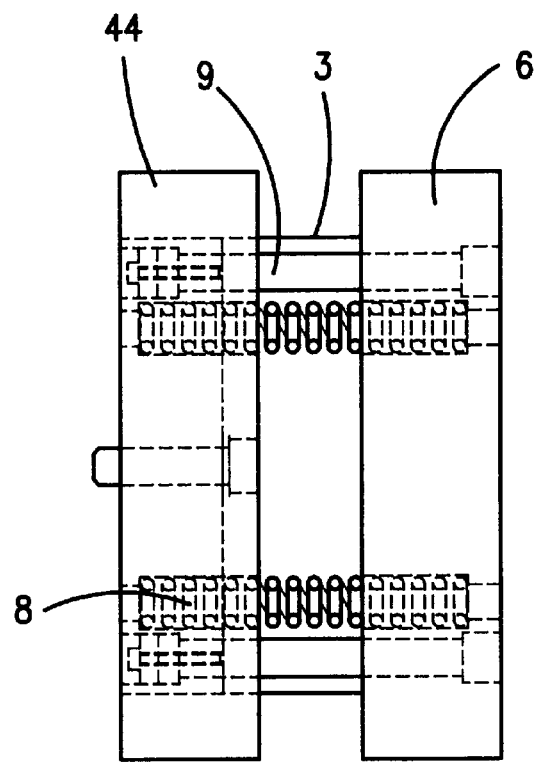
FIG. 13 is a side view of the molding die unit according to the present invention.
Figure 14:
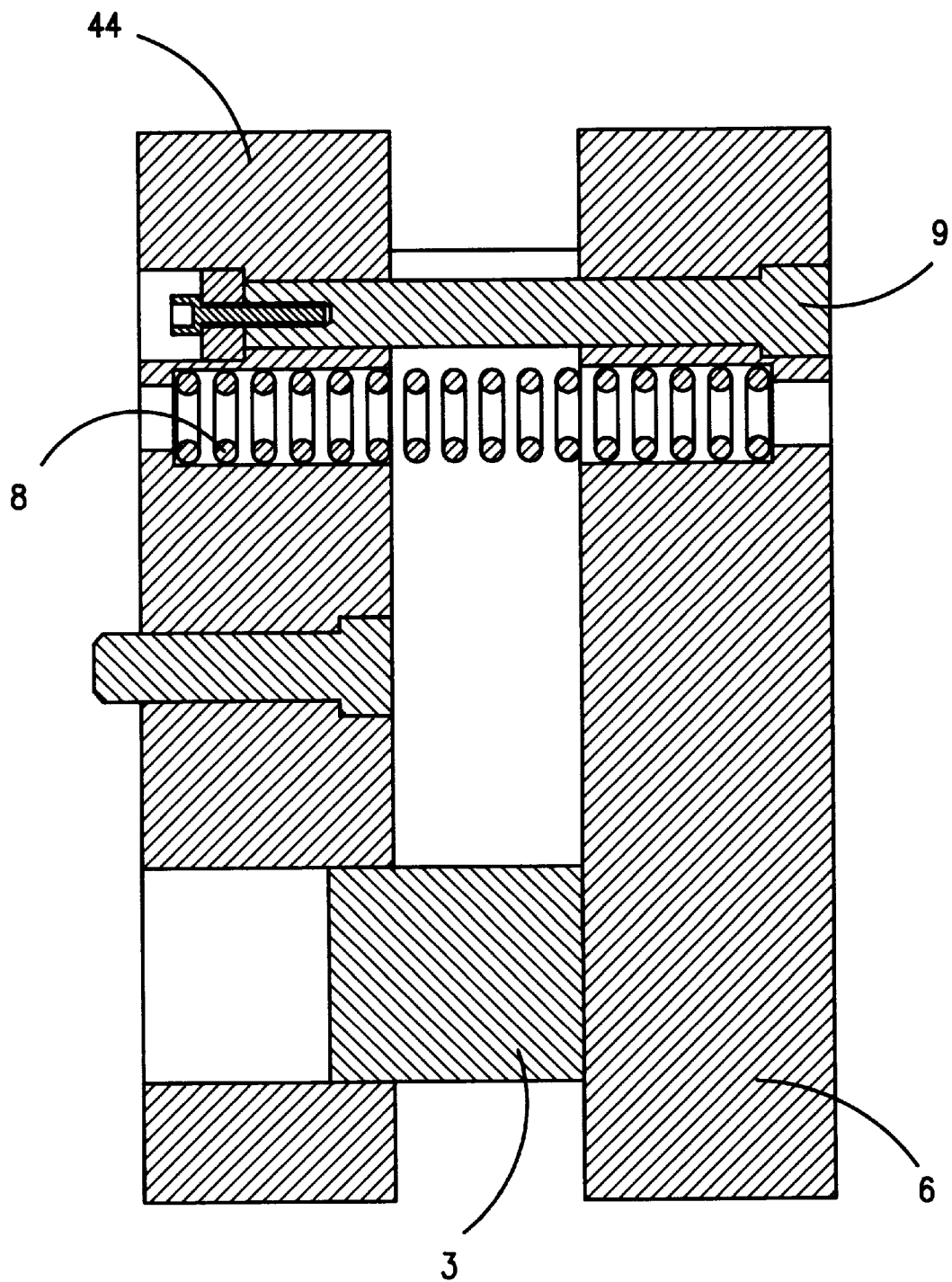
FIG. 14 is a sectional view of the molding die unit according to the present invention.

Referring to FIGS. 12, 13 and 14, guide rods 9 are fixedly mounted on the base plate 6 and inserted through holes (not shown) on the frame 44 for guiding the movement of the frame 44. A spring 8 is mounted between the base plate 6 and the frame 44 to force them apart. When the squeezing force is released, the spring 8 immediately pushes the base plate 6 and the frame 44 apart, causing them to be returned to their former positions.

Figure 16:
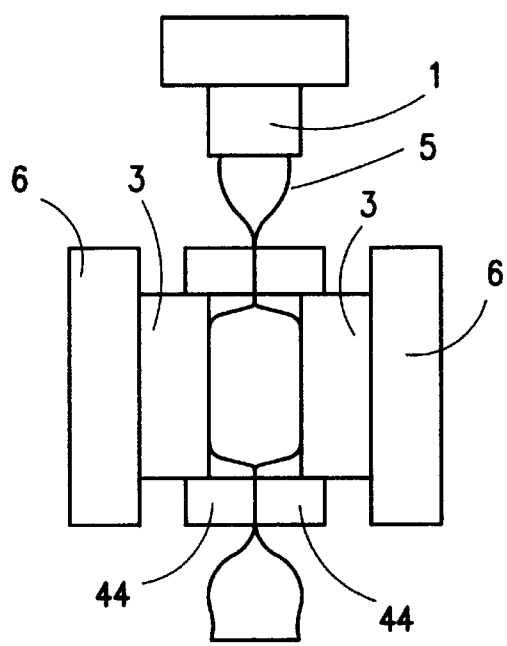
FIG. 16 is a plain view showing the two ends of the extruded molding clamped by the frame of the molding die unit according to the present invention.
Figure 17:
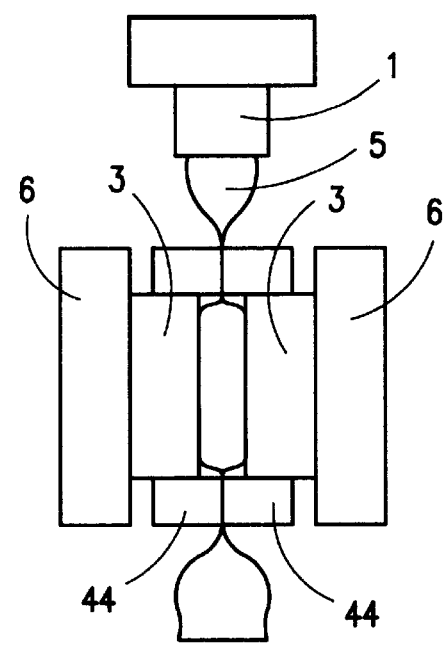
FIG. 17 is a view showing the two ends of the extruded molding clamped by the frame of the molding die unit and the molding die closed on the molding.

Referring to FIGS. 16 and 17, the clamping and compressing procedure can be completed before the molding die 3 is lowered.

It is to be understood that the invention described herein is for purposes of example and illustration only, and is not intended as a definition of the limits and scope of the disclosed invention.

What the invention claimed is:

1. A process of extrusion molding comprising the steps of:
   a) extruding a rubber material downwardly through an extruding die to form a hollow tubular molding therefrom;
   b) driving a first clamping device from a first original position to clamp a lower portion of the molding and driving a second clamping device from a second original position to clamp an upper portion of the molding to form an air-tight space within the molding between the clamping devices;
   c) closing two corresponding halves of a molding die defining a die cavity around the air-tight space of the molding between the clamping devices and compressing the molding, said molding die including a pin with a through hole, the air-tight space being of sufficient volume so that the internal air pressure within the molding is increased and said increase in internal air pressure causes said hollow tubular molding to conform to a final product configuration defined by the die cavity during compressing of the molding, said hollow tubular molding also conforming to said pin and entering said through hole in said pin to form a thinned wall portion; and thereafter
   d) opening the two die cavity halves of the molding die and returning the clamping devices to their respective first and second original positions and removing a final product from said molding die, said thinned wall portion breaking upon removal of said final product from the molding die to allow the escape of internal air.

2. A process of extrusion molding comprising the steps of:
   a) extruding a metal material downwardly through an extruding die to form a hollow tubular molding therefrom;
   b) driving a first clamping device from a first original position to clamp a lower portion of the molding and driving a second clamping device from a second original position to clamp an upper portion of the molding to form an air-tight space within the molding between the clamping devices;
   c) closing two corresponding halves of a molding die defining a die cavity around the air-tight space of the molding between the clamping devices and compressing the molding, said molding die including a pin with a through hole, the air-tight space being of sufficient volume so that the internal air pressure within the molding is increased and said increase in internal air pressure causes said hollow tubular molding to conform to a final product configuration defined by the die cavity during compressing of the molding, said hollow tubular molding also conforming to said pin and entering said through hole in said pin to form a thinned wall portion; and thereafter
   d) opening the two die cavity halves of the molding die and returning the clamping devices to their respective first and second original positions and removing a final product from said molding die, said thinned wall portion breaking upon removal of said final product from the molding die to allow the escape of internal air.

3. A process of extrusion molding comprising the steps of:
   a) extruding an extensible inorganic substance downwardly through an extruding die to form a hollow tubular molding therefrom;
   b) driving a first clamping device from a first original position to clamp a lower portion of the molding and driving a second clamping device from a second original position to clamp an upper portion of the molding to form an air-tight space within the molding between the clamping devices;
   c) closing two corresponding halves of a molding die defining a die cavity around the air-tight space of the molding between the clamping devices and compressing the molding, said molding die including a pin with a through hole, the air-tight space being of sufficient volume so that the internal air pressure within the molding is increased and said increase in internal air pressure causes said hollow tubular molding to conform to a final product configuration defined by the die cavity during compressing of the molding, said hollow tubular molding also conforming to said pin and entering said through hole in said pin to form a thinned wall portion; and thereafter
   d) opening the two die cavity halves of the molding die and returning the clamping devices to their respective first and second original positions and removing a final product from said molding die, said thinned wall portion breaking upon removal of said final product from the molding die to allow the escape of internal air.

4. A process of extrusion molding comprising the steps of:
   a) extruding a material through an extruding die to form a hollow tubular molding;
   b) driving a first clamping device from a first original position to clamp a first portion of the molding;
   c) moving the first clamping device to stretch the molding;
   d) driving a second clamping device from a second original position to clamp a second portion of the molding and form an air-tight space in the molding between the first and second clamped portions thereof;
   e) closing two corresponding halves of a molding die defining a die cavity around the air-tight space of the molding between the clamping devices and compressing the molding, said molding die including a pin with a through hole, the air-tight space being of sufficient volume so that the internal air pressure within the molding is increased and said increase in internal air pressure causes said hollow tubular molding to conform to a final product configuration defined by the die cavity during compressing of the molding, said hollow tubular molding also conforming to said pin and entering said through hole in said pin to form a thinned wall portion; and thereafter
   f) opening the two die cavity halves of the molding die and returning the clamping devices to their respective first and second original positions and removing a final product from said molding die, said thinned wall portion breaking upon removal of said final product from the molding die to allow the escape of internal air.

5. The process of claim 4 wherein the material is a thermoplastic material.

6. The process of claim 4 wherein the material is an extensible organic substance.

7. The process of claim 4 wherein the material is extruded downwardly, the first clamping device clamps a lower portion of the molding and moves downwardly to stretch the molding downwardly, and the second clamping device clamps an upper portion of the molding.

* * * * *